United States Patent

Cyman, Jr. et al.

[11] Patent Number: 5,845,302
[45] Date of Patent: Dec. 1, 1998

[54] METHOD AND SYSTEM FOR PRODUCING HIGH-QUALITY, HIGHLY-PERSONALIZED PRINTED DOCUMENTS

[75] Inventors: Theodore F. Cyman, Jr., Grand Island; George Hampton; Robin Ross, both of Niagara Falls; Edward W. Schimminger, Tonawanda, all of N.Y.

[73] Assignee: Moore Business Forms, Inc., Grand Island, N.Y.

[21] Appl. No.: 581,741

[22] Filed: Dec. 29, 1995

[51] Int. Cl.⁶ ........................................... G06T 1/00
[52] U.S. Cl. ..................... 707/517; 707/520; 707/539
[58] Field of Search ............... 395/777, 779, 395/782, 766, 768, 769; 707/539, 500, 515, 517, 520, 505, 507, 508, 513, 908

[56] References Cited

U.S. PATENT DOCUMENTS

| | | | |
|---|---|---|---|
| 4,539,653 | 9/1985 | Bartlett et al. | 395/782 |
| 4,933,880 | 6/1990 | Borgendale et al. | 395/777 |
| 4,949,287 | 8/1990 | Yamaguchi et al. | 395/782 |
| 5,133,051 | 7/1992 | Handley | 395/776 |
| 5,142,620 | 8/1992 | Watanabe et al. | 395/508 |
| 5,163,130 | 11/1992 | Hullot | 395/334 |
| 5,170,467 | 12/1992 | Kubota et al. | 395/782 |
| 5,179,650 | 1/1993 | Fukui et al. | 395/782 |
| 5,214,755 | 5/1993 | Mason | 395/782 |
| 5,337,406 | 8/1994 | Takakura et al. | 395/782 |
| 5,349,648 | 9/1994 | Handley | 395/779 |
| 5,459,826 | 10/1995 | Archibald | 395/779 |
| 5,550,968 | 8/1996 | Miller et al. | 395/332 |
| 5,552,982 | 9/1996 | Jackson et al. | 395/779 |
| 5,625,804 | 4/1997 | Cooper et al. | 395/779 |
| 5,644,723 | 7/1997 | Deaton et al. | 395/214 |

OTHER PUBLICATIONS

C–RIP Color Raster Image Processor Operator's Guide & Technical Reference, Nov. 28, 1995.
XL Data System Operator's Manual, Software Version 2.01, Jun. 1992.

*Primary Examiner*—Joseph H. Feild
*Attorney, Agent, or Firm*—Nixon & Vanderhye P.C.

[57] ABSTRACT

Variable color configuration (VCC) relates to an automated system which allows for the printing of high-quality, highly-personalized documents in relatively small quantities and in a cost efficient manner, when compared with conventional runs. The system relates to a reliable means by which the correct colored images, as well as variable or selective or static or fixed text can be merged into a single, complete document. The system allows for the insertion of fixed as well as variable data into the layout of the document.

5 Claims, 6 Drawing Sheets

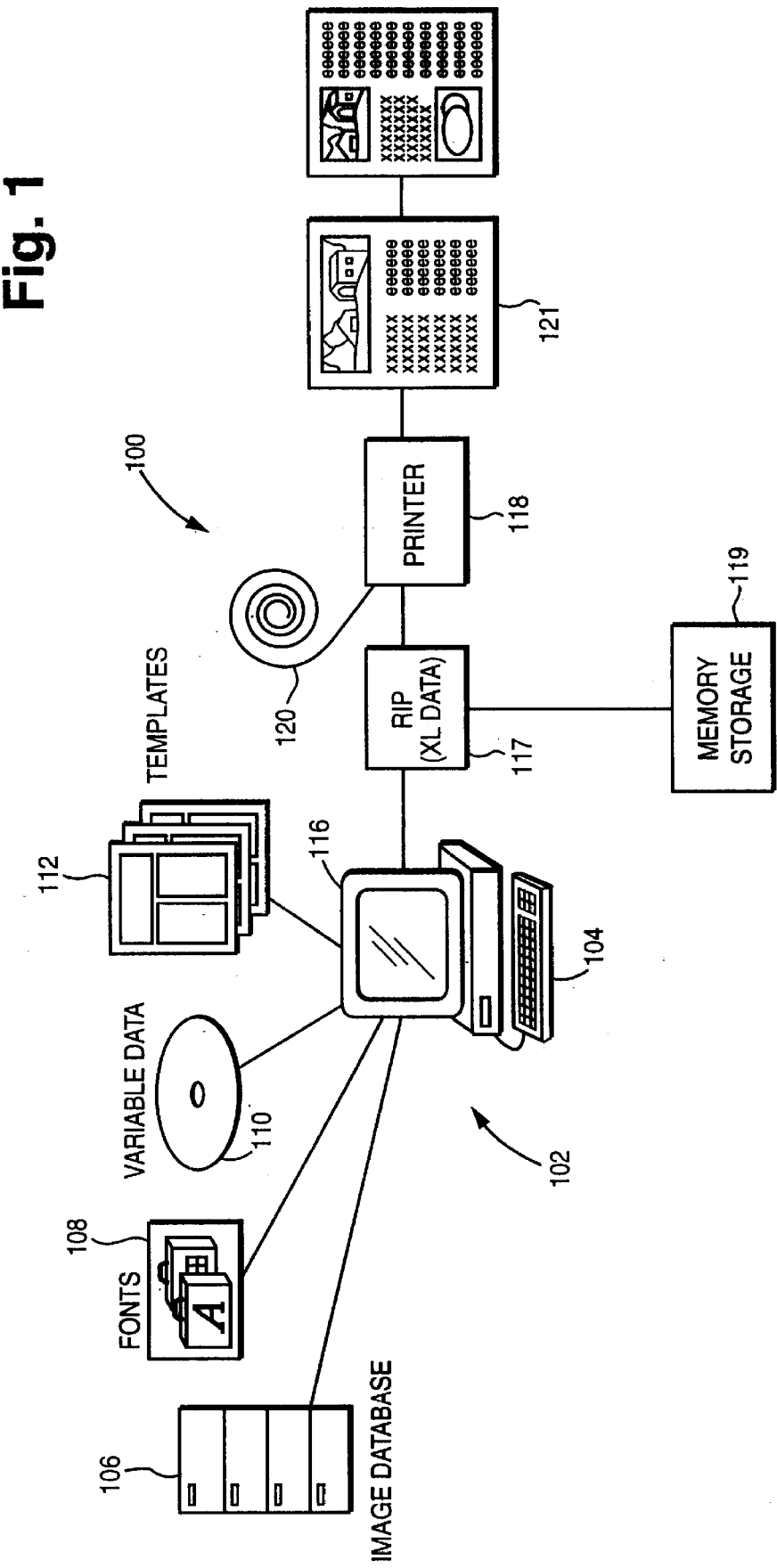

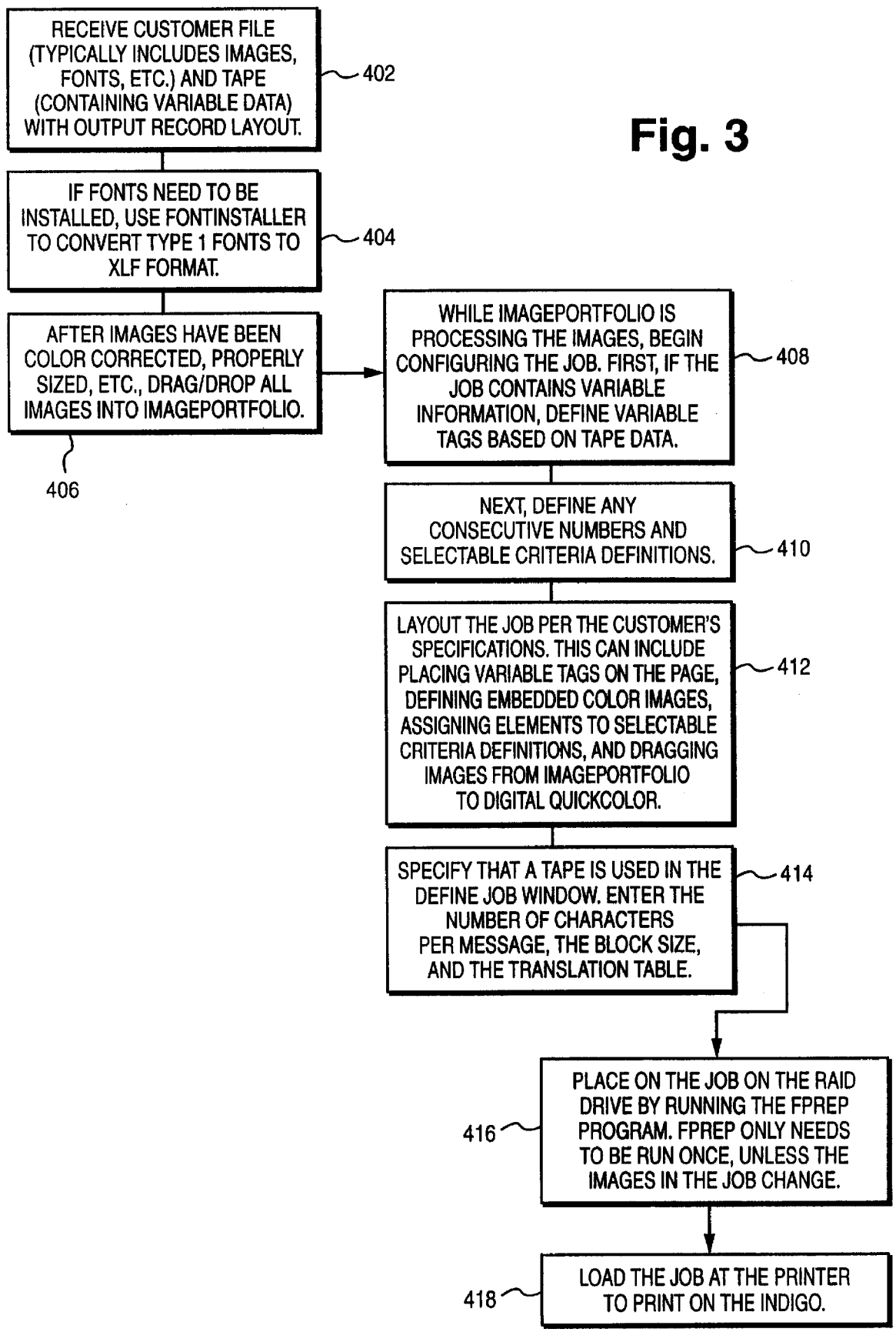

METHOD AND SYSTEM FOR PRODUCING HIGH-QUALITY, HIGHLY-PERSONALIZED PRINTED DOCUMENTS

FIELD OF INVENTION

The subject invention relates to the fields of computer aided document creation, desktop publishing and printing.

BACKGROUND AND SUMMARY OF THE INVENTION

Variable color configuration (VCC) relates to an automated system that provides for the printing of high-quality, highly-personalized documents in relatively small quantities and in a cost efficient manner, when compared with conventional runs. The system relates to a reliable means by which the correct colored images, as well as variable or selective or static or fixed text can be merged into a single, complete document. The system allows for the insertion of fixed as well as variable data into the layout of the document.

Prior to the introduction of VCC, a customer for a particular print job would submit a data tape containing various textual information which the customer wanted printed in association with a print order. The textual information might describe the agents and services of a particular insurance agency, vacation information from a travel agency, information about a chain of hotels or restaurants or other such promotional materials. In addition, the data tapes may or may not include data for images or graphics which the customer would want included in the print job. These images might be, for example, pictures of the individual insurance agents offering the described insurance programs, travel destinations, or pictures of he interior of restaurants or of a standard hotel room.

In the prior art, production runs of relatively low numbers of documents, such as several dozen to a few thousand, were not generally available or commercially viable. The technology was not available to make low production print orders that were commercially practical and cost effective. Commercial print businesses could not generally realize a profit when printing smaller quantities and would not run small print orders. The equipment set up required for large print presses, and the extensive time needed to set up and proof print orders made small orders cost prohibitive. To obtain a low cost per printed document, a customer previously ordered a large number of printed documents, usually an amount greater than 10,000 documents. By ordering a large print run, the customer often ordered more documents than were need and consequently discarded large numbers of unneeded printed documents.

In addition, targeted direct market mailings (e.g., personalized with addressee's name) of advertisements and the like generate a better consumer response than do simple bulk mail solicitations (e.g., with no personalization of the mailed material). Most recipients of bulk mail solicitations simply disregard the mailings as "junk mail" and discard the mailings unopened. To increase the likelihood that a direct mailing solicitation is read by the target audience, personalized information is incorporated into the mailer to attract the recipient's attention. For example, Mr. Ralph Chestnut is more likely to open and read an advertisement with the salutation "Dear Mr. Chestnut" than to read an advertisement that begins "Dear Occupant." Unfortunately, the addition of personalized information to a direct mail print order increases the cost of the print order, and forces the customer to take delivery of a larger order than desired. Alternatively, some commercial printers offer cut-rate, low volume print orders, but the printed materials are not personalized and have substantially inferior print quality and color in text, graphics and images. Customers of cut-rate, low volume orders have had to accept a finished print product which is not "polished."

There is a long-felt need for a print system which can produce small print orders of high-quality and highly-personalized documents in a commercially-feasible and profitable manner. The present invention is directed to solving the problems faced by small print order customers and provides a low-cost means to produce high-quality printed documents with vibrant images in relatively-small quantities. Another object of the invention is to produce small print orders that serve the customer's needs, provide flexibility of print orders by allowing for changes to be readily made to the document template design without having to completely re-design the document template, and simultaneously allow the printer to profit from small print runs.

The customer submits to a printer a data tape of print order information, that may include variable text data such as names, addresses and advertising materials, and images, for a sequence of document to be printed. The customer also generally may have a rough layout of the document design to be printed. The information on the tape is first checked by the printer for errors, and corrected so that the information contained on the tape can be printed in a single pass without having to continually stop and start the order to correct for errors. In the prior art, the data tape or tapes is often in different formats and/or fonts, that must be individually converted to common fonts and formats that are compatible with the printer. The present invention automatically converts the various fonts and formats on a data tape, regardless of the fonts and format of the text, images and graphics (e.g., TIFF (tagged image file format), EPS (encapsulate postscript) or PS (postscript)) into a single format and compatible fonts that conform to the designated print engine. This conversion of print formats and fonts is accomplished through software known as Image Portfolio offered by Moore Business Forms, Inc., of Grand Island, N.Y.

Once the customer print order information from the data tape or the like has been checked for errors and reformatted, a print operator at the print facility assigns fields of varying lengths to the variable customer information (error free, and reformatted) on the tape. The fields set an orgainizational structure to the variable data that is later used to merge the variable data with fixed data and selectable conditions into a document to be printed. For instance, if the field for names of insurance agents is 20 characters long, the print operator assigns a variable field of 20 spaces for agent names. The assigned field has a length of 20 characters and would be located at position 1 and extend to position 20 (referred to as position 1 (1–20)) in the document. Similarly, the address of the agent may have up to 35 characters, and is assigned to the next field starting at position 21 for a length of 35 (21 (21–56)). Biographical information on the agents may contain up to 500 characters. Accordingly, a biographical field would be assigned beginning at position 57 for a length of 500, (57 (57–557)). Other variable information, such as the hours of operation, the place and facsimile number of the agent would also be assigned to particular fields based on the length of the characters of information in each field. In this way, the variable information from a customer supplied data tape is catalogued into a series of fields on the tape such that the information may be systematically extracted from the tape by referring to the fields during the print raster imaging process.

Once the fields have been determined for the textual information on the customer data tape, fields relating to the graphics information are similarly assigned and defined in a similar manner. Such graphic and images may be the logo of the particular insurance agency, a picture of the office, as well as a picture of the agent. The variable fields relating to the graphics/image information may be interspersed with the text fields or may precede the textual information, depending on how the customer has blocked the text, images, graphics, in the document design. The assignment of variable fields is done before and without regard to where the fields will be printed on the document to be printed.

After the variable fields have been established for both the textual, graphic and image information, the operator assigns this field variable information to select criteria, which are defined in "tags." The tags are tools to position the variable information (text, graphics or images) from the data tape and other memory sources onto the page layouts of a document. The operator lays out the dimensions of each page or pages of the printed document on a computer screen. Fixed information, such as text that is printed on each document may be typed or copied directly onto the document page layout. Variable information is assigned to specific locations on the document page layout by reference to the tag that identifies the field on tape or other memory location for the variable data to be merged into the document at printing.

In addition, the operator may assign one or more "select groups" to form a "selectable" area or location on the document page. A select group is a conditional assignment of information that is printed only if a condition is satisfied. For example, a select group may be assigned to print a particular text paragraph and image only when the zip code is "14174" at field position 5 for a length of 5 on the tape. Similarly, another select group may be assigned to print different text and image when the zip code is 14178. In the example of an insurance agency, the operator may place in the first "select group" the agency logo, a picture of the office and brief text about the history of the agency that is printed on every other document. A select group can comprise an entire page of a printed document, or a segment of a page. There may be several select groups on a single page. Similarly, a select group may comprise two facing pages, fold-out pages, or insert pages and other document sections.

To position variable information on a page layout, the operator selects the desired tags from the defined fields for the variable information (text any/or images) and positions the tags on the page layout of the document. The tagged fields are displayed to the operator on the work station screen. The tag name is what shows up for variable fields. Fixed text is displayed on the page layout on the screen as the text will appear on the printed page.

In a select group area(s) for the page, in keeping with our example, the operator might group together all images and text pertaining to a particular agent John Doe, for example, the agent's picture, name and biographical information. Another select group might contain information pertaining to agent Jane Smith, including the agent's picture, name and biographical information. In addition, a select group A may be created by inserting graphics/images from pre-established files, such as a picture of a family (when the portion of the services concerning life insurance is supposed to appear) along with an item describing appropriate policies on life insurance for young families, or alternatively, a select group B may be created with a picture of an elderly couple enjoying their retirement on a beach somewhere along with a text item describing an IRA (individual retirement account) or retirement planning. The select group defines the condition to be satisfied to print the fixed information or tagged variable information, and the location on the page layout for the information if it is to be printed.

In this example, perhaps select group A would be printed when the age of the intended receiver of the brochure is 30–39, and perhaps select group B is printed when the age of the receiver is 40–49. (In this case, if "4" appears at tape position 5 for a length of 1, testing for which decade describes the receiver's age.) Once all tags have been positioned on the layout, the operator (and customer) inspect the layout to ensure compliance with the customer's requirements and instructions. Once complete, the layout is saved to the network file server. At print time the layout is down loaded to the data system when the variable data is merged into the page layout at the tagged locations specified by the layout. The data system performs the selection criteria and pages are compiled on-the-fly for a color raster image processor (CRIP) that assembles the data necessary for printing and sends the print ready data to a high speed color printer. A color raster image processor is a device offered by Moore Business Forms Inc. and is described in greater detail in co-pending and commonly-assigned U.S. Patent application Ser. No. 08/500,011, entitled "High Resolution Real Time Raster Image Processing System And Method", and filed Jul. 10, 1995, which application is incorporated by reference and is referred to as the Raster Image Processing (RIP) System application. Using the present invention, brochures could be printed in a variety of formats for a large number of agents, all from this one print job.

Another application for the present invention is for printing of direct mail advertisements. For example, a sports promoter wants to distribute a color brochure outlining the changes to Rich Stadium, a new player acquisition for the Buffalo Bills, and highlight the coming Bills' season to generate season ticket sales. To design the mailer, the print operator chooses certain images (for example, pictures of the stadium, scoreboard, a team photograph, team logo, season ticket schedule, and player roster) and assigns each image to a field and tags each field into the layout of a page of the mailer. Once the layout of the mailer is completed, the operator integrates a preestablished mailing list (a variable field) into the print data by selecting a tag, e.g., tag "ADR" for address, and drops this into the variable field designated for the address. This tag represents variable addressees of each person who will receive a personalized mailer with their name.

Alternatively, the print operator may tag as a particular variable field a certain zip code, known to have residents likely to purchase season tickets, such as people with homes near the stadium. On printing of the brochure, the printing system would select names from the mailing list and insert each name into a printed brochure until all names on the list were printed. In a further embodiment, the system could, with every tenth address, for example, insert a coupon for particular goods by printing the coupon on the brochure in an area which otherwise is only a colored box in the nine of ten brochures without the coupon.

Once all the fields have been selected for the document layout, and all the select groups have been filled in, the system creates a "job file" which is a description of the entire document page by page, and sends the job or document file to the XL Data System, available from Moore Business Forms, Inc., Grand Island, N.Y., and is more fully described in commonly-assigned RIP System application referred to above. The document file provides instructions to the data system so that the data system can configure itself, that is, set up the print job and the page layout prior to providing instructions to the printer. The job or document file contains a thousandths of an inch by thousandths of an inch layout of the print job. Although the resolution of the target print engine is supplied, by simply changing the engine definition, the job could be run on another print engine with a different resolution. In an 800×800 dpi printer, there would be 800 pixels per inch.

The XL Data System is a computer interface between a computer workstation and/or network and a print engine (also referred to as the printer). The XL Data System includes a raster image processor (RIP) that can keep up with the fastest high resolution printers now available. It can process images "on the fly"—that is, generate images from compact input representations so rapidly that printing can occur substantially in the same real time as the RIP processor processes the input data. This has substantial benefit to customers because it allows print orders to be turned around very rapidly, thereby satisfying the requirements of "just in time" delivery —which was not possible using some prior RIP based systems.

The ability to form print images in real time is further enhanced by the use of a high speed data cache and associated array disk drive to provide high speed throughput of data into the system. The disk array may, for example, store a library of high resolution graphics that can be accessed "on the fly" as needed in response to the input data stream. The disk array may provide very high storage capability and throughput (e.g., total storage of 32 gb of information that can be accessed at a rate of over 50 mb per second). This allows the XL Data System to access graphical images while the particular print job is underway—enabling nearly simultaneous conversion, retrieval and printing of graphics and images. A data caching arrangement coupled to the disk array provides a FIFO (first-in-first-out) caching/buffering arrangement to maximize throughput and reduce access time.

To further enhance graphics capabilities, the XL Data System may also provide a custom graphics accelerator that can generate, on the fly, many "primitive" or simple graphics (e.g., angles, lines, boxes, etc.) at the same time that the remainder of the print image is being generated.

The XL Data System has a completely modular architecture including an XL interface module for input data synchronization and interfacing, a master controller module for overall control and coordination, an RISC high speed processor module for data conversion and manipulation, a Font Image Memory ("FIM") module for storing bit images of fonts, a Binary Image Generator ("BIG") module for double-buffered storage of full-page images, and an Engine Control Module ("ECM") controlling and interfacing with particular printer or other output devices.

In the processing and printing of documents, a job block or file is provided which contains a description of the entire job to be run including a page-by-page layout of the job. Once input is received, the RIP collects and assembles the characters and other image "objects" in a full page bitmap memory. The information provided with the job determines the size and positioning of text and graphics. The system automatically "remembers" where certain characters are positioned so as not to duplicate or overlay new characters.

BRIEF DESCRIPTION OF THE DRAWINGS

FIG. 1 is a schematic of computer and printing hardware that may be used as part of a system according to the present invention;

FIG. 3 is a flowchart illustrating the software control for implementing an embodiment of the present invention.

DETAILED DESCRIPTION OF THE DRAWINGS

Figure 2A:
FIGS. 2A, 2B and 2C are front views of examples of printed documents produced with the system shown in FIG. 1.

FIG. 1 schematically illustrates an example of a computerized document design and printing system 100 that utilizes the present invention. A desktop document design system 102, such as an IBM-compatible personal computer (e.g., a Sun Microcomputer System), may provide one example of a hardware platform on which the present invention may be implemented. The desktop document design system preferably includes a keyboard 104 and/or other operator input means, such as a drawing tablet with input pen, coordinate tablet with input mouse or image scanner. The desktop workstation 102 is also adapted to receive input data from a variety of sources. For example, the work station may have disk drive(s) or CD ROM drive(s) to receive digital data. Similarly, the workstation may be connected by modem over telephone lines to sources of digital data. Digital data relates to the text, graphics and image files used by the document designer (work station operator) to form the desired document.

Examples of sources of data input to the design workstation 102 include image data bases 106, font files 108, tapes 110 of variable data such as addressee lists, lists of insurance agents, telephone numbers, and a wide variety of other variable data. The variable data may be stored electronically on other storage mediums which are all conventionally known. In addition, the document design work station 102 may also receive input of document templates 112 which are data files of exemplary document templates. Each template may also be referred to as a "generic job file." Template documents can be used by the work station operator as a starting layout to design the desired document to be printed.

The workstation is used to reformat the various customer input data such as images and fonts, into formats suitable for a print engine 118. Customer data may also be input by dragging and dropping fixed text and images into the page layout program. The input data is manipulated by the operator of the workstation 102 to create on the display screen 116 of the workstation the desired document design. Once the document design has been properly set up on the screen and the variable data tagged into the layout, with selection groups created, the workstation outputs a digital jop print file to the network file server connected to the color raster image processor (CRIP) 117 and print engine 118. The print engine may be a high speed commercial color printer such as is available from Moore of Grand Island, N.Y. Using the print file created on the workstation, the data system merges variable data onto the layout and performs selection criteria to create a data system to be processed by the CRIP. This information is fed to the printer which continuously prints the designed documents. Because of the high degree of personalization available with the present invention, the print file may contain tags for variable information, as set up by the work station and derived from the variable data 110 imported into the work station, to print personalized or otherwise unique documents, continuously, each of which can be completely different from the preceding, and completely different from the following.

An advantage of the present invention is that it is capable of merging text, image and graphic data files into an electronic file suitable for a printer or print engine. In particular, the variable imaging system of the present invention is adapted to convert various text, image and graphic files into a print format that is compatible with the digital printer (color or black and white) attached to the document design work station. For example, the work station 102 is adapted to receive input data in formats such as TIFF (tagged image file format), EPS (encapsulate postscript), or PS (postscript) which are common formats used in documents set up for both graphic, text and/or images. However, the variable data should be in a fixed length field record format for purposes of tagging. In addition, the images need to be prescreened by the image portfolio software or be in CMYK TIFF format. Accordingly, it is not necessary that the input data from the image data base 106 (variable data tape 110) or templates 112 be Rather, these sources of data may be in various different formats which are to be converted by the work station 102.

Figure 2B:
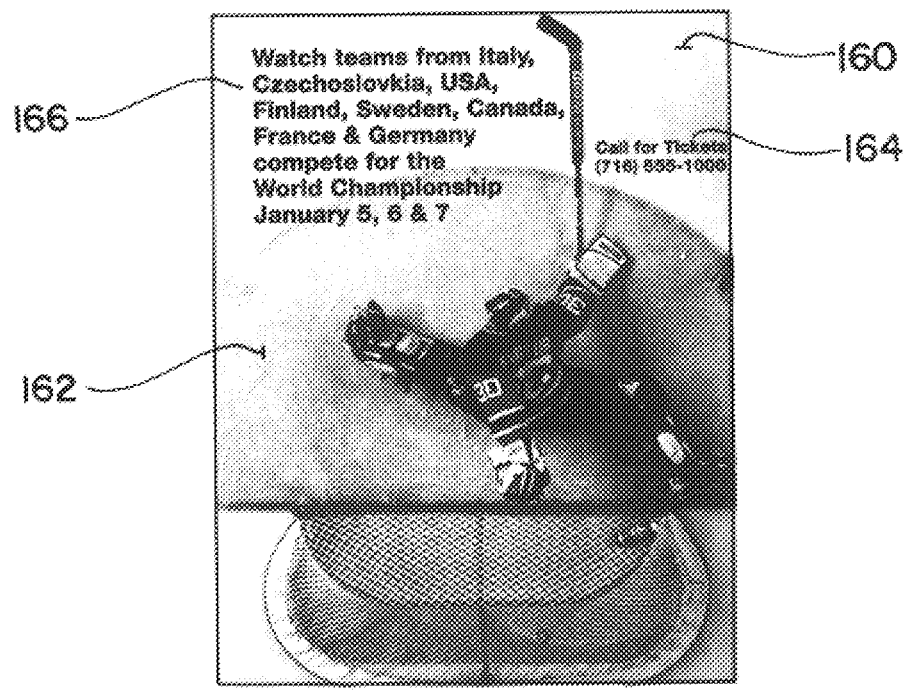
Figure 2C:
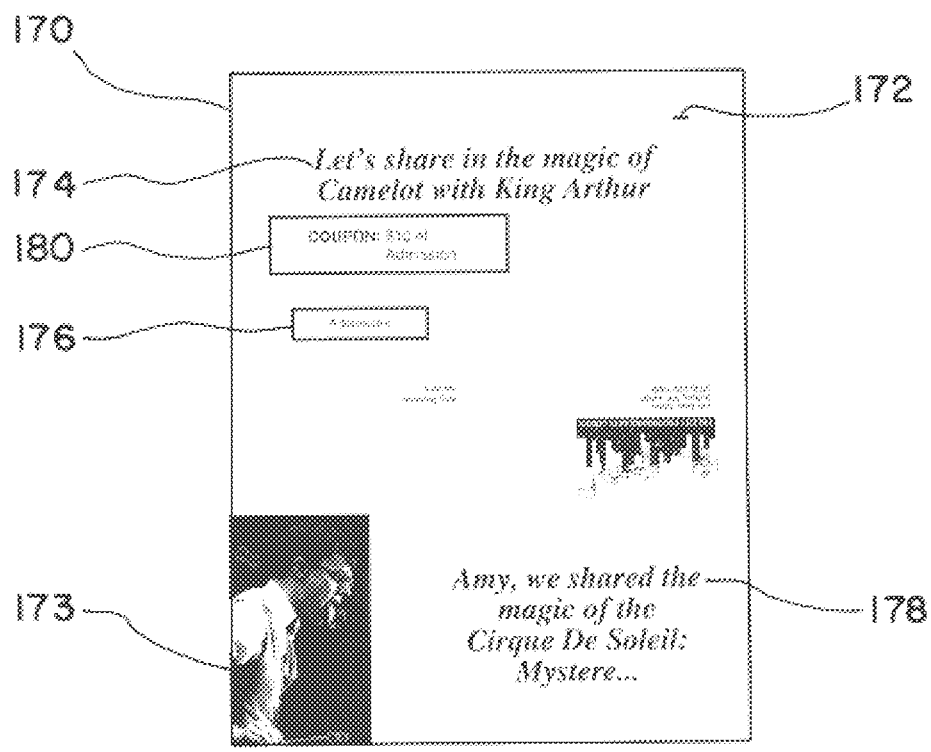

FIGS. 2A, 2B and 2C show examples of documents that are created and printed by an embodiment of the present invention. As shown in FIG. 2A, the front side of the document 150 has been designed with a color photographic image 152 in the right top quadrant (an example of a select group) of the document. This image came originally from the image data base 106 and was selected by the document design operator using the work station 102 who blocked out, i.e., selected a group, on an electronic screen image of the document presented on the computer display 116. The operator tagged the right top quadrant of the document on the computer screen with instructions to receive the image by linking the image field with a tag. Similarly, non-variable text 154 has been inserted in the left top corner of the document. This text may have been manually entered by the operator using the keyboard 104 and blocked out on the screen image of the document page by the operator.

Similarly, a three month calendar appears in a bottom section 156 of the document. This calendar may have been selected by the operator from data files, e.g., 110, which may have included a variety of different calendar text. In addition, the calender text 156 may be variable in that the three months printed on the document may vary as different runs of the document are printed at various times in the year. In other words, documents printed in the early portion of the year may have the spring calender (e.g., April, May June) and documents printed in the middle of the year may have a fall calender (e.g., September, October, November). Finally, additional text 158 may be inserted with various fonts to provide text information such as scheduling of events. The document design operator may select a font(s) 108 for the text of the schedule information to emphasize certain aspects of the text, such as dates of certain events.

Similarly, FIG. 2B shows a document 160 that has a photographic image 162 that is printed on the entire document. Superimposed over the photographic image is printed text 164 and 166. The text may include a non-variable promotional description such as description of sports events to occur in the near future 166, or may include variable information 164 such as telephone numbers, which was obtained from variable data files 110 and may change as successive copies of the document are printed. FIG. 2C is another example of a document printed by this system 170. The back face 172 of the document combines a photographic image 173 in the bottom left quadrant of the document with non-variable text 174 printed on top of the photograph. Adjacent the photograph is variable text such as an address 176 and a personalized greeting 178. In addition, a selectable coupon 180 may also be variably printed on the document 170.

The present invention allows an operator of the document design work station 102 to lay out each page of the documents shown in FIGS. 2A through 2C as an electronic image on the screen of the work station 116 before the document is printed. In this manner, the document design is done expeditiously, and can be checked by the designer and customer before the print file is sent to the printer for printing. The designer or customer can also print a layout proof on any postscript printer. This pre-print checking avoids costly print errors and reduces the time required to prepare a document for printing. Moreover, because the digital print file generated by the work station is set up to be integrated with variable data the data system, the digital printer will print a sequence of different pages from one digital job print file and, thus, may print sequentially each page, such as FIG. 2A, 2B, 2C, on successive pages from the printer. This ability to electronically change print pages using the same print file at the data system feeding the CRIP, and therefore the printer, is a further reason why short print runs can be accomplished with this invention. This pre-print checking avoids costly print errors and reduces the time required to prepare a document for printing. Moreover, because the digital job print file generated by the work station is set up for each document or document page, the XL Data System and printer can print a sequence of digital job print files and, thus, may print sequentially each page, such as FIGS. 2A, 2B, 2C, on successive pages from the printer. This ability to quickly switch print pages at the printer is a further reason why short print runs can be accomplished with this invention.

The print engine 118 shown in FIG. 1 prints on a continuous "web" 120 of paper supplied, for example, from a large paper roll 117 at high speeds of up to 300 to 500 feet per minute. Print engine 118 includes electronic print heads that print images on the web as the web travels through the print engine (i.e., "plateless printing"). The printed web 120 is processed by conventional paper handling mechanisms (e.g., cutters, staplers, gluers, folders, collators, stackers, etc.) to provide finished printed products 121.

FIG. 3 is a high-level flow chart showing the operation of a software controls used to implement one embodiment of the invention. In step 402, the work station under control of the operator receives as input the customer data file which may include data from an image data base 106, variable data tape 110 or document template(s) 112. Often, the customer file includes variable images, texts and graphics that are in different formats which may or may not be compatible with the printer. Similarly, the customer text files may be in fonts which may or may not be compatible with the printer. In addition, the customer files may include variable data, such as mailing lists, that are to be used for creating personalized print documents.

Once the customer files are input into the work station, the work station under control of the operator first checks the customer file for data errors or data omissions. Also in step 404, the work station converts or adds new fonts for the customer text which are compatible to the printer using a "fontinstaller". For example, the font installer may convert Adobe Type1 fonts which are commonly found in customer files to "XLF" format which is compatible with a printer. Fontinstaller takes Adobe Type1 outline fonts and prepares them for use with both the Variable Color Configuration program and the XLC data system. For example, an Adobe Type1 font is dragged and dropped across the display screen using a mouse input device into a folder icon for the print job. At that point the file is converted into the printer font ASCII (PFA) format. Next, the program builds from the PFA the AFM file to prepare it for use. The AFM file is the Adobe Font Metrics file 2. The AFM file and the Adobe Type 1 file will appear as one font in a Font Panel on the display. The Adobe Type1 file will have a check sum header and trailer applied and will be moved into an 8.3 filename format (8 characters before the '.', and 3 after) to be used on the workstation data system.

With respect to step 406, the graphics and images are converted into a printer compatible format, in a manner somewhat similar to the conversion of text fonts in step 404. In step 406 images and graphics are formatted for compatibility with the printer. In particular, images received from the customer files or other sources such as library files available to the printer operator, are prescreened and color corrected automatically to adjust to the particular printer using "Image Portfolio." The Image Portfolio software allows the operator to prescreen and color adjust for printing all images and store them into a common format that is compatible with the printer. The operator need not prescreen all images, the system will also except continuous tone images in the CMYK TIFF format.

Image Portfolio provides visual management of TIFF and EPS files, as well as the ability to prescreen these files. The user may also choose to create a 72 dpi image for use in "Variable Color Configuration" to speed up image placement and display. Multiple TIFF and EPS files may be dragged into a portfolio window for easy viewing. Each image will maintain the same aspect ratio, but will be scaled down to fit the confines of the image cell so that many images can be viewed simultaneously. The displayed images may then be selected and cut, pasted, or dragged into other applications accepting TIFF and/or EPS files. Additionally, the list of file paths which comprise the contents of a portfolio may also be saved to a file for later retrieval.

In step 408, which may be performed while the Image Portfolio software is processing the images and graphics, the layout of the pages of the document is designed on the display screen. Initially, select groups are set up for each of the blocks of textual information which will be inserted into the print document. The select groups are defined by their size and number of characters. If the text is to remain constant, the operator may key the text in or import the text from another program application directly into the select group shown on the screen. If variable text is to be used, then the variable text must be tagged to a field. Each field may contain variable information. Also, in step 408 the variable information may also be defined by variable tags which provide a link to the variable text information contained in the customer file, such as on data tapes. These tags are used by the work station operator to locate blocks (select groups) of variable information on the page layout for the document. The tags link the variable data from the customer tape to a specific name describing the field. This is then referenced by the text object that the operator locates on the page layout of the document.

Personalization makes a document to be printed differ from preceding and following printed documents. For example, a designer may wish to create a brochure marketed toward buyers of fine wine, as an advertisement for a wine shop. Suppose that the wine shop has a special buyer's card issued to its most frequent customers. Suppose further that each time the customer makes a purchase and presents the buyer's card, the wine selection made by the customer is recorded in the wine shop's database. The database indicates the buyer's preference for wine. The wine shop decides that it would like to produce a targeted mailing to all frequent users of the buyer's card. The wine shop would provide the data set for each customer, including name, address, and a two codes indicating which coupons should be included in the mailing, perhaps one coupon for a favored wine selection and one coupon for a different category of wine, with the intention of encouraging the buyer to broaden his selection of wines. There are perhaps twenty different possible coupons, but each customer will receive only two coupons. As printed, every brochure is the same, except in the personalization area of the brochure where the name, address and coupon are printed. The name and address for the customer are variable fields; the coupon is part of a selectable group. Although the coupon itself is not stored in a variable data file, the information which causes the coupon to be retrieved and inserted in the print file is a variable field.

Figure 4A:
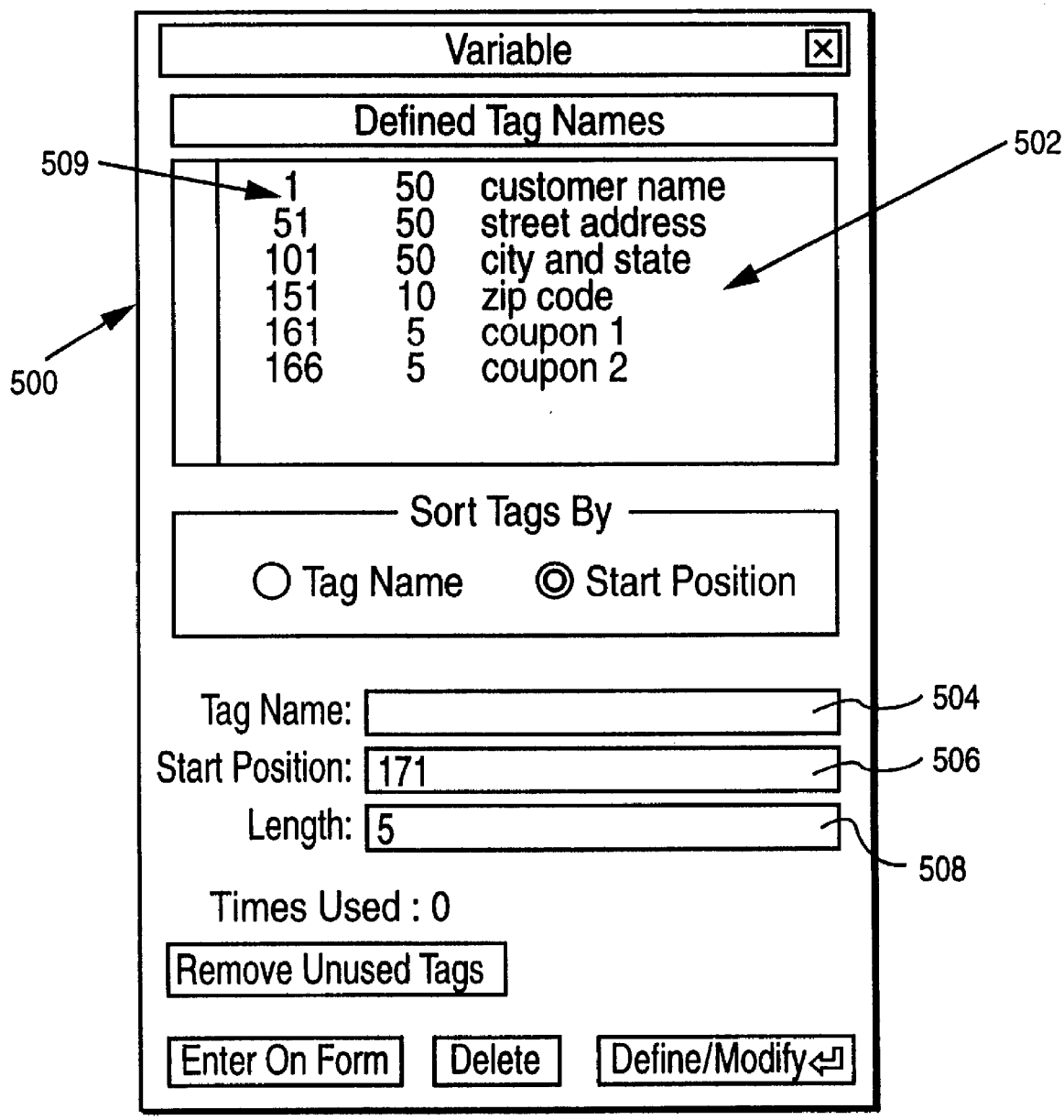
FIG. 4A and 4B are computer menu displays showing exemplary variable and selectable criteria menus.

Once the document designer has received artwork and a data file from the wine shop the designer is ready to layout the variable fields. As shown in FIG. 4A, the designer uses a "variable" menu 500 to assign tags to certain positions in the data file to specify where on a document a variable field is to be placed. The tags 502 in this example are customer name, street address, city and stage, zip code, coupon1 and coupon2. Customer name, street address, city and state, zip codes are all tags that describe variable fields that will be placed on the document. Coupon1 and coupon2 are tags that describe variable fields that will be used in setting up a selectable group. Each tag is identified by a name 504, and is assigned a starting position 506 and a maximum length 508. Once entered in the computer, the tags are stored as a list 509. Customer name starts at position 161 in the data file, and extends for a length of 50 bytes. In FIG. 4A, the tags have been sorted by start position of each field on tape. The numbers in the first column are start positions. A start position is the number of the byte count into a record in a variable data file where the information starts. The second column is the length of the data associated with the tag. This length is a maximum; while the data may not exceed this length, it may be of a smaller length. The third column contains the tagname.

Figure 4B:
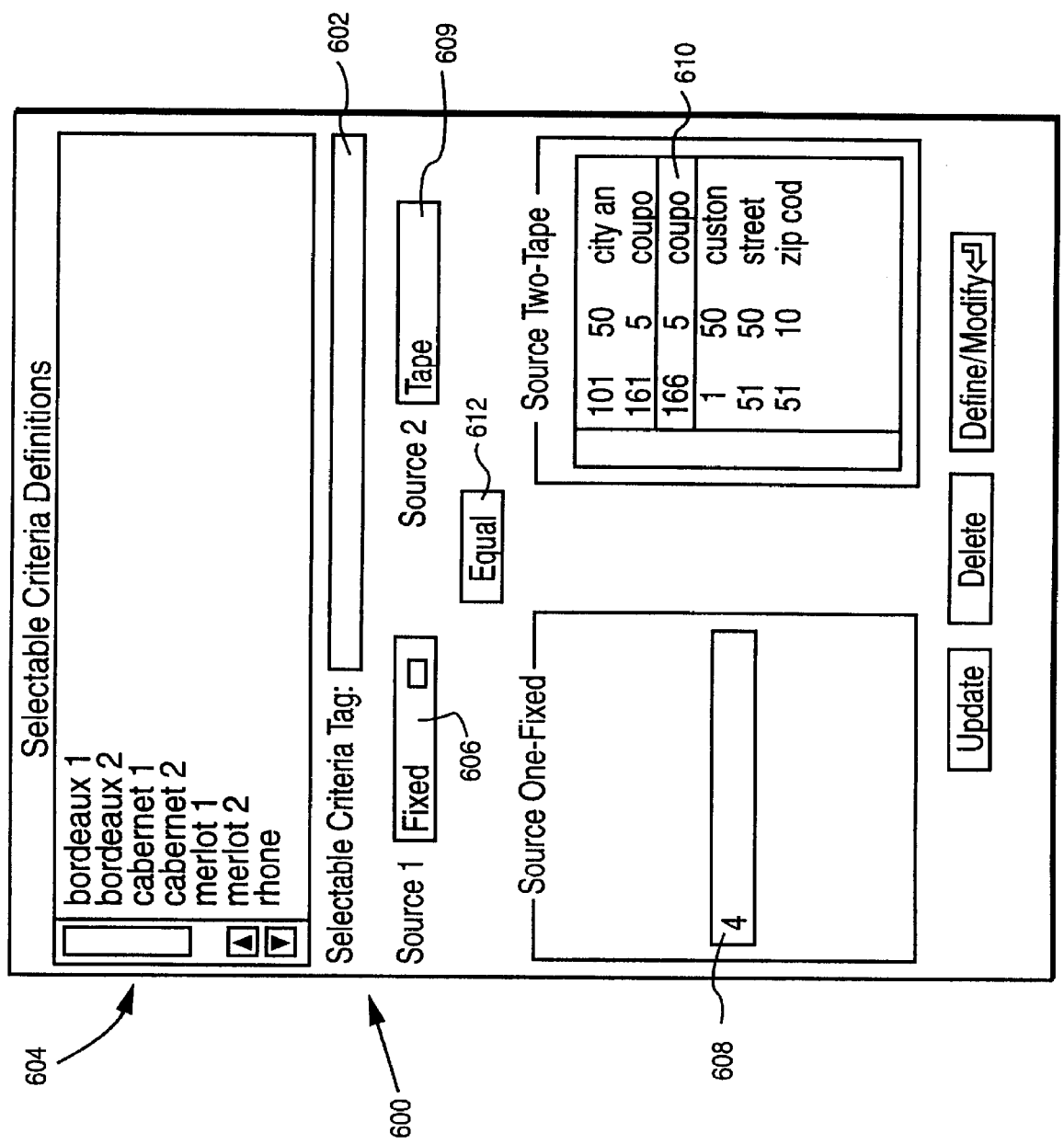

FIG. 4B shows a menu 600 for establishing selectable groups on a document layout. For example, a designer receives artwork from a wine shop for each of twenty different coupons. Since each customer will receive only two coupons the designer will assign each coupon to one or more selectable groups. A particular selectable group will be printed on the document only when the selection criteria for the group has been met such a prescribed zip code or other customer criteria or sequence number. It is up to the designer to create the selection criteria. The designer will use the design selectable criteria choice from the selectable criteria menu. The selectable criteria menu 600 includes an input box 602 for defining a selected criteria tag (see variable menu shown in FIG. 4A), and a list 604 of selectable criteria tags previously created. For example, to define a selected criteria for the placement of wine coupons for a cabernet the selectable criteria tag name "cabernet" (see FIG. 4A) is inserted in the box 602 and the selectable criteria may be to compare a fixed number 608, e.g., 4, to a "coupo" data tagged variable field 610. When the coupon field on a data tape, for example, has the number 4 then the selection criteria is satisfied and the print information linked to the "cabernet" seletable criteria is printed according to the corresponding page layout. To define a selection criteria, e.g., cabernet, a criteria must be set up by selecting a first source 606 such as a fixed number to be compared (equal to, not equal to, greater than, less than, or other Boolean logic expression 612) to a second source 609, which is generally a variable data source. For example, the first source 608 may be a fixed number, such as 4, the comparision may be an "equal to" logic statement 612, and the second source is a tagged data field from a tape 610.

A selection criteria is used in conjunction with a document layout to specifice a conditionional print instruction. For example, a designer may layout a page for a wine store advertisement mailer that includes a section for one or more coupons. The designer will insert a cuopon(s) into the block that are intended for customers that have previously purchased four or more bottles of cabernet wine. To ensure that only those prior purchasers receive the mailer with the cabernet coupons, the designer blocks out the cuopon area and designates the blocked out area with a selectable criteria for "cabernet". Similarly, the designer may next recreate the same page layout with different coupons intended for customers who have purchased "bordeaux", and then assigns the bordeaux selection criteria to a select group that covers the cuopon area. Using the select group tools, a designer may effectively personalize a template or generic job layout by specifying select groups and selection criteria for different variations of the template or generic layout.

After a designer has created a document, it is stored in a generic job file. This file is a series of data structures and information that indicates to the data system which information is to be printed on the device. The file includes information regarding the layout of the data file or tape, the size of the document, duplex or simplex, the device type, tag information, filled column information, graphic information, color bit image information and numerous other pieces of information describing items on the document (for example, font, color, point size, item size. . . ) refer to the generic job file specification for information on specific data structures.

The data system reads and interprets the file, sending on pertinent information to the printer. The data system compiles the fixed information in the generic job file with the variable fields from the data file or tape and passes it on to the raster image processor (RIP), which in turn rasterizes the printed page.

As shown in the flowchart of FIG. 3, in step 410 the work station operator sets definitions for consecutive numbers which are to be printed consecutively on consecutive copies of the printed document. For example, when printing blank bank checks, the check number is sequentially numbered from check to check. In addition to defining consecutive number fields, the work station operator may define other selectable criteria such as customer names and addresses.

In step 412 the actual layout of the page is done on the display screen by the work station operator. The operator generally has a drawing layout from the customer or a written specification from the customer as to what the document layout should be. A template document (e.g., generic job file) may also be displayed on the screen. Using the work station software, the operator views an electronic image of the page on the computer display screen. For example, the variable tags identifying variable text information may be input to the proper location of the page layout. Similarly, sections of the page layout may be blocked as "select groups" into which text fields may be linked or images may be assigned. In addition, images and graphics that were set up in step 406 are assigned to their proper location on the page layout by using a program such as "Image Portfolio" and "dragging" the image/graphic file to a program such as VCC (variable color configuration). In addition, a template layout from a template source 112 may be used to provide an initial layout of the page. The template document may come with group segments and other layout information already prepared. The template is then modified by adding variable tags, text fields and other images and graphics pursuant to the customer's specification.

In step 414, the particular customer data, such as on a data tape, is assigned to the document layout using the "define job" window of the software. In addition, the text fields identify the number of characters per message and the block size for the tapes.

Finally, in step 416, the completed page layout for each of the pages of the document are reviewed by the work station operator and possibly customer for accuracy and completeness. The final electronic layout for the entire document is then stored in computer memory, such as a hard drive on a network accessible to the work station. The Fprep step reads the prepared generic job file, collects the names of all the color images required by the job and copies the color images to a place where the color raster image processor can access them as it builds each page. The Fprep step is performed before a job can be printed.

Fprep is a computer program that reads job files and copies image files to a computer storage device, such as a hard disk 119. The storage device is attached to both the computer running Fprep and the color RIP 117. When the job is printed, the CRIP reads the images from the disk as it prepares each page. Fprep runs, for example, on a Sun Microsystems computer. The computer must be networked to the image file storage area in order to find the images referenced in the job. The Fprep program formats the layout such that all images and graphics are in a format suitable for printing. The Fprep program needs to be only run once on a document so as to properly format the images and graphics. Subsequent changes to the text of the document, such as changes to variable text information, need not cause the document to be re-run through the Fprep program. Finally, the electronic file of the document is down loaded on the data system, which then merges the variable information from the tape/file with the fixed information, and performs the selection criteria, so that the entire document can be run on the printer.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for producing high-quality, highly-personalized printed documents using a computer workstation with a display screen comprising the steps of:

(a) receiving at the workstation variable and fixed data from at least a first customer data source where the first customer data source is from any one of a plurality of different customers and the variable and fixed data is any one of a plurality of different formats;

(b) converting the variable and fixed data into a uniform format;

(c) defining fields that identify and locate the variable and fixed data on the first customer data source;

(d) displaying a document page layout on the display screen (e) arranging the placement of variable and fixed data to be printed by positioning tags on the document page layout, where each tags identifies one of the fields defined in step (c);

(f) blocking out a group section of the page layout to define a select group, where the group section includes one or more tags;

(g) setting a selection criteria for the select group that conditions the printing of the data corresponding to the tags in the select group on whether a predetermined condition in the variable data is satisfied;

(h) creating a job file representing the document layout with tagged fields and select groups to be printed;

(i) transmitting the job file to a print station;

(j) assembling print instructions for a document about to be printed by merging the job file with the variable and fixed data by using the tags in the job file to extract variable data from the fields corresponding to the tags and checking whether the selection criteria is satisfied for each document to be printed to assemble, and (k) printing documents in accordance with the print instructions created in step (j).

2. A method for producing high-quality, highly-personalized printed documents as in claim 1 wherein step (a) further comprises receiving an electronic list of customer addresses as variable data, and the electronic list is formatted in one of a plurality of different file formats for addresses.

3. A method for producing high-quality, highly-personalized printed documents as in claim 1 wherein step (a) further comprises receiving electronic data regarding products previously purchased by customers, step (c) further comprises defining as a field the data regarding products previously purchased by specific customers, and step (g) further comprises setting as the predetermined condition the field the data of regarding products previously purchased by specific customers.

4. A method for producing high-quality, highly-personalized printed documents as in claim 1 wherein step (a) further comprises receiving electronic data regarding products previously purchased by specific customers, and two or more fixed images, step (c) further comprises defining the data of regarding products previously purchased by specific customers as a first field, and the two or more fixed images as other fields, step (e) further comprises placing a tag corresponding to at least one of the other fields corresponding to images, step (f) further comprises blocking out as a select group a section of the page layout that includes the tag corresponding to the other fields, and step (g) further comprises setting as the predetermined condition the first field the data regarding products previously purchased by specific customers.

5. A method for producing high-quality, highly-personalized printed documents using a computer workstation with a display screen comprising the steps of:

(a) receiving at the workstation variable and fixed electronic data from at least a first customer data source of a plurality of customer data sources available from a plurality of customers, where the variable data includes a list of customer names and products or services previously purchases by each customer, and the fixed data includes two or more images corresponding to the products or services;

(b) converting the variable and fixed data into a uniform format, where the variable and fixed data may be any of a plurality of different formats;

(c) defining fields that identify and locate the variable and fixed data on the customer data source;

(d) displaying a document page layout on the display screen;

(e) arranging the placement of customer name and at least one of the images corresponding to the products or services to be printed by positioning tags on the document page layout, where each tags identifies one of the fields defined in step (c);

(f) blocking out a first section of the page layout to define a first select group of the customer data source, where the first section includes a tag corresponding to the at least one of the images corresponding to the products or services positioned in step (e);

(g) setting a selection criteria for the first select group that conditions the printing of the data corresponding to the tag in the first select group on whether the customer previously purchased the products or services corresponding to the at least one of the images included in the first select group;

(h) blocking out a second section of the page layout to define a second select group, where the second section includes a tag corresponding to a second one or more images corresponding to the products or services positioned in step (e);

(i) setting a selection criteria for the second select group that conditions the printing the data corresponding to the tag in the second select group on whether the customer previously purchased the products or services corresponding to the second one or more images included in the first select group;

(j) creating a job file representing the document layout with tagged fields and select groups to be printed;

(k) transmitting the job file to a print station;

(l) assembling print instructions for a document about to be printed by merging the job file with the variable and fixed data by using the tags in the job file to extract variable data from the fields corresponding to the tags and checking whether the selection criteria is satisfied for each document to be printed to assemble, and (m) printing documents in accordance with the print instructions created in step (1).

* * * * *